US011605147B2

United States Patent
Kalele et al.

(10) Patent No.: US 11,605,147 B2
(45) Date of Patent: Mar. 14, 2023

(54) METHOD AND SYSTEM FOR TUNING GRAPHICS PROCESSING UNIT (GPU) PARAMETERS OF A GPU KERNEL

(71) Applicant: Tata Consultancy Services Limited, Mumbai (IN)

(72) Inventors: Amit Kalele, Pune (IN); Manoj Karunakar Nambiar, Thane West (IN); Barnali Basak, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 95 days.

(21) Appl. No.: 17/203,224

(22) Filed: Mar. 16, 2021

(65) Prior Publication Data

US 2021/0304350 A1 Sep. 30, 2021

(30) Foreign Application Priority Data

Mar. 27, 2020 (IN) .............................. 202021013507

(51) Int. Cl.
*G06T 1/20* (2006.01)
*G06F 9/38* (2018.01)
*G06F 9/54* (2006.01)
*G06T 1/60* (2006.01)

(52) U.S. Cl.
CPC .............. *G06T 1/20* (2013.01); *G06F 9/3836* (2013.01); *G06F 9/545* (2013.01); *G06T 1/60* (2013.01)

(58) Field of Classification Search
CPC . G06T 1/20; G06T 1/60; G06F 9/3836; G06F 9/545; G06F 9/5011
See application file for complete search history.

(56) References Cited

U.S. PATENT DOCUMENTS

| 2017/0199558 | A1* | 7/2017 | Farazmand | G06F 1/3296 |
| 2018/0314935 | A1* | 11/2018 | Lewis | G06N 3/084 |
| 2019/0043158 | A1* | 2/2019 | Levit-Gurevich | G06T 1/20 |
| 2020/0081748 | A1* | 3/2020 | Johnson | G06F 9/3887 |

(Continued)

OTHER PUBLICATIONS

Guerreiro et al., "Multi-Kernel Auto-Tuning on GPUs: Performance and Energy-Aware Optimization," International Conference on Parallel, Distributed, and Network-Based Processing (2015).

(Continued)

*Primary Examiner* — Jacinta M Crawford
*Assistant Examiner* — Donna J. Ricks
(74) *Attorney, Agent, or Firm* — Finnegan, Henderson, Farabow, Garrett & Dunner, LLP

(57) ABSTRACT

This disclosure relates generally to method and system for tuning graphics processing unit (GPU) parameters of a GPU kernel. The disclosure proposes a combination of both heuristic and deterministic techniques for tuning GPU parameters of a GPU kernel to achieve optimal configuration of the GPU parameters. The proposed method and a system for tuning GPU parameters is based on deterministic techniques and heuristic techniques that includes capturing behavior of the GPU application by monitoring several GPU hardware counters that comprise several hardware resources and performance counters. The proposed tuning GPU parameters also implements a set of heuristic techniques to decide course of the tuning for various GPU parameters based on the captured behaviour of the GPU hardware counters.

10 Claims, 6 Drawing Sheets

(56) References Cited

U.S. PATENT DOCUMENTS

2021/0065051 A1* 3/2021 Khan ................. G06N 3/02
2021/0103434 A1* 4/2021 Venkat ............... G06F 8/36
2021/0110506 A1* 4/2021 Prakash ............. G06F 9/4887
2021/0191759 A1* 6/2021 Fong ................. G06F 9/5072

OTHER PUBLICATIONS

Guo et al., "Auto-Tuning CUDA Parameters for Sparse Matrix-Vector Multiplication of GPUs," International Conference on Computational and Information Sciences (2010).
Li et al., "Critical Points Based Register-Concurrency Autotuning for GPUs," International Conference on Parallel, Distributed, and Network-Based Processing (2016).
Lim et al., "Autotuning GPU Kernels via Static and Predictive Analysis," Distributed, Parallel, and Cluster Computing (2017).

* cited by examiner

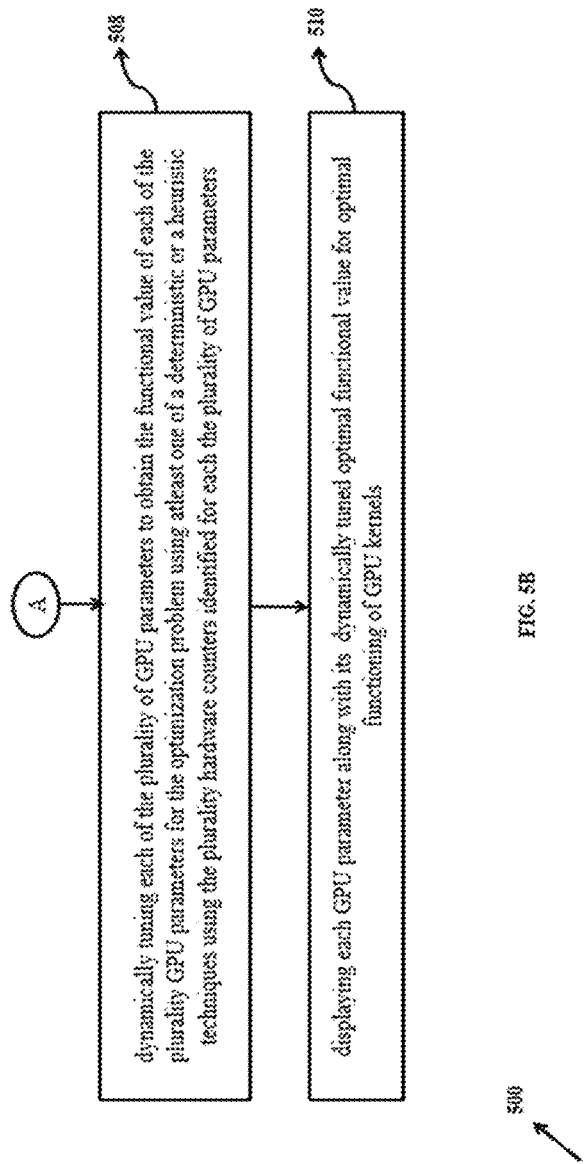

METHOD AND SYSTEM FOR TUNING GRAPHICS PROCESSING UNIT (GPU) PARAMETERS OF A GPU KERNEL

CROSS-REFERENCE TO RELATED APPLICATIONS AND PRIORITY

The present application claims priority from Indian provisional application no. 202021013507, filed on Mar. 27, 2020.

TECHNICAL FIELD

The disclosure herein generally relates to field of graphics processing unit (GPU) and, more particularly, to field of tuning graphics processing unit (GPU) parameters of a GPU kernel.

BACKGROUND

A graphics processing unit (GPU) is a specialized electronic circuit that is designed to rapidly manipulate-alter memory for creation of images in a frame buffer intended for output to a display device. The GPUs are becoming increasingly popular for their efficient high performance at manipulating computer graphics and image processing. Although the GPUs provide high performance, exploiting their complete performance potential is a challenging task, more particularly determining/tuning a set of GPU parameters that have a significant impact on performance of the GPU kernel is a challenging aspect.

Most of the existing techniques for GPU parameter tuning have a black box type approach for tuning, wherein various heuristics are applied to reach a global optimum. The heuristic techniques typically work with an objective or a cost function and work their way in guessing the next set of parameters to be evaluated, wherein the cost function could be latency or completion time, or system throughput or resource utilization or any combination of these metrics. However, the heuristics techniques do not consider the underlying structure of the system being optimized.

Further few other techniques for GPU parameter tuning strive to understand the systems, wherein various deterministic techniques often rely on extensive experimentation to arrive at a set of optimal values of the GPU parameters. The extensive experimentation would involve observing the system (mostly manually), collecting performance counters to understand the underlying hardware, to further estimate the next best parameter configuration.

SUMMARY

Embodiments of the present disclosure present technological improvements as solutions to one or more of the above-mentioned technical problems recognized by the inventors in conventional systems. For example, in one embodiment, a method and a system for tuning graphics processing unit (GPU) parameters of a GPU kernel is provided. The disclosure proposes a combination of both heuristic and deterministic techniques for tuning GPU parameters of a GPU kernel to achieve optimal configuration of the GPU parameters. The proposed method and a system for tuning GPU parameters is based on deterministic techniques and heuristic techniques that includes capturing behavior of the GPU application by monitoring several GPU hardware counters that comprise several hardware resources and performance counters. The proposed tuning GPU parameters also implements a set of heuristic techniques to decide course of the tuning for various GPU parameters based on the captured behaviour of the GPU hardware counters.

In another aspect, a method for tuning graphics processing unit (GPU) parameters of a GPU kernel is provided. The method includes receiving a plurality of data regarding a GPU application, wherein the plurality of data regarding the GPU applications includes a plurality of GPU parameters to be tuned for optimal functioning of GPU kernels, an execution time of the plurality of GPU parameters to be tuned, the GPU application's architecture, a plurality hardware counters and a plurality of performance counters. The method further includes representing a functional value for each the plurality of GPU parameters as an optimization problem defined for in terms of a response function, wherein the response function includes at least one of the plurality hardware counters or the execution time of the GPU parameter. The method further includes continuously monitoring and capturing behavior of the plurality of GPU parameters to identify at least one hardware counter from the plurality hardware counters that impact the execution time of the GPU kernel and functioning of the plurality of GPU parameters to be tuned. The method further includes dynamically tuning each of the plurality of GPU parameters to obtain the functional value of each of the plurality GPU parameters for the optimization problem using at least one of a deterministic or a heuristic techniques using the plurality hardware counters identified for each the plurality of GPU parameters. The method further includes displaying each GPU parameter along with its dynamically tuned optimal functional value for optimal functioning of GPU kernels.

In another aspect, a system for tuning graphics processing unit (GPU) parameters of a GPU kernel is provided. The system comprises an input module configured an input module configured for receiving a plurality of data regarding a GPU application, wherein the plurality of data regarding the GPU applications includes a plurality of GPU parameters to be tuned for optimal functioning of GPU kernels, an execution time of the plurality of GPU parameters to be tuned, the GPU application's architecture, a plurality hardware counters and a plurality of performance counters. The system further includes a functional value module configured for representing a functional value for each the plurality of GPU parameters as an optimization problem defined for in terms of a response function, wherein the response function includes at least one of the plurality hardware counters or the execution time of the GPU parameter. The system further includes a hardware counter identifier for continuously monitoring and capturing behavior of the plurality of GPU parameters to identify at least one hardware counter from the plurality hardware counters that impact the execution time of the GPU kernel and functioning of the plurality of GPU parameters to be tuned. The system further includes a dynamic tuner configured for dynamically tuning each of the plurality of GPU parameters to obtain the functional value of each of the plurality GPU parameters for the optimization problem using at least one of a deterministic or a heuristic techniques using the plurality hardware counters identified for each the plurality of GPU parameters. The system further includes a display module configured for displaying each GPU parameter along with its dynamically tuned (tuned) optimal functional value for optimal functioning of GPU kernels.

Another embodiment provides a non-transitory computer-readable medium having embodied thereon a computer program for a computer readable program, wherein the computer readable program, when executed by one or more hardware processors, causes for tuning graphics processing unit (GPU) parameters of a GPU kernel is provided. The program includes receiving a plurality of data regarding a GPU application, wherein the plurality of data regarding the GPU applications includes a plurality of GPU parameters to be tuned for optimal functioning of GPU kernels, an execution time of the plurality of GPU parameters to be tuned, the GPU application's architecture, a plurality hardware counters and a plurality of performance counters. The program further includes representing a functional value for each the plurality of GPU parameters as an optimization problem defined for in terms of a response function, wherein the response function includes at least one of the plurality hardware counters or the execution time of the GPU parameter. The program further includes continuously monitoring and capturing behavior of the plurality of GPU parameters to identify at least one hardware counter from the plurality hardware counters that impact the execution time of the GPU kernel and functioning of the plurality of GPU parameters to be tuned. The program further includes dynamically tuning each of the plurality of GPU parameters to obtain the functional value of each of the plurality GPU parameters for the optimization problem using at least one of a deterministic or a heuristic techniques using the plurality hardware counters identified for each the plurality of GPU parameters. The program further includes displaying each GPU parameter along with its dynamically tuned optimal functional value for optimal functioning of GPU kernels.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5A and FIG. 5B is an exemplary flow diagram of a method for tuning graphics processing unit (GPU) parameters of a GPU kernel according to some embodiments of the present disclosure.

DETAILED DESCRIPTION OF EMBODIMENTS

Figure 1:
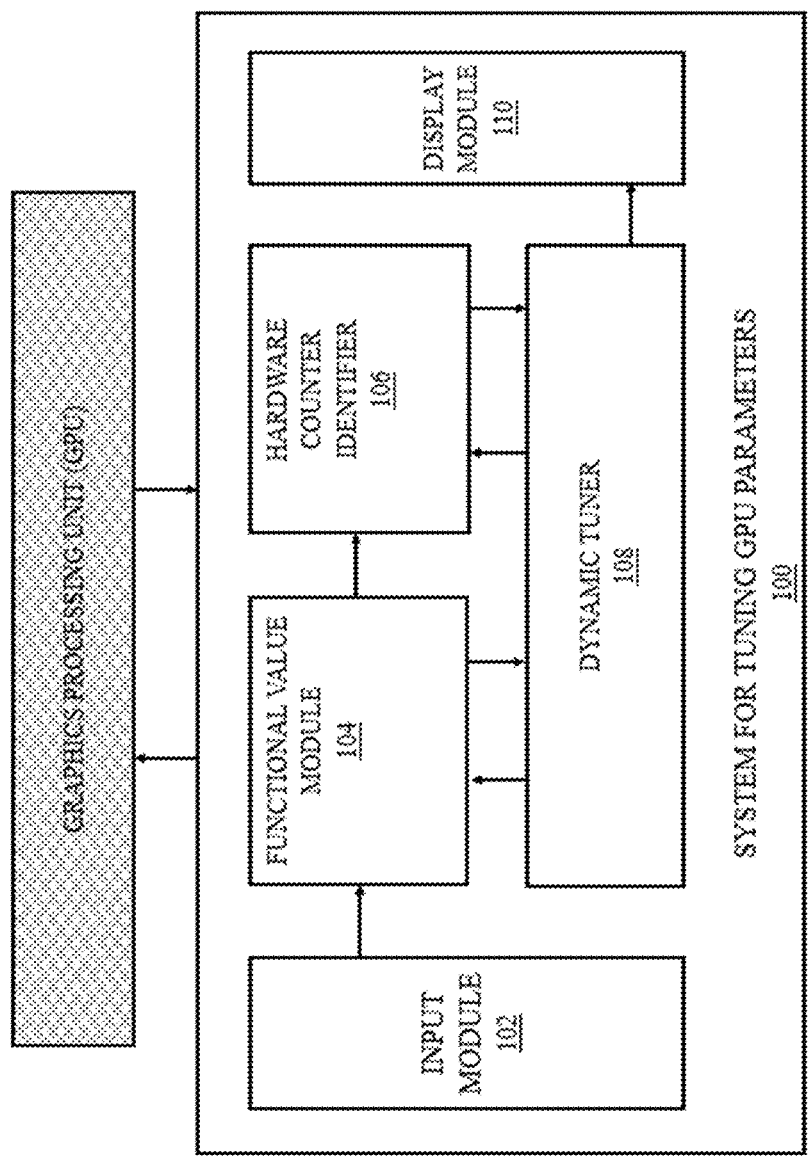
FIG. 1 is a functional block diagram of a system for tuning graphics processing unit (GPU) parameters of a GPU kernel in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The disclosure proposes a method and a system for tuning graphics processing unit (GPU) parameters of a GPU kernel is provided. The disclosure proposes a combination of both heuristic and deterministic techniques for tuning GPU parameters of a GPU kernel to achieve optimal configuration of the GPU parameters. The proposed method and a system for tuning GPU parameters is based on deterministic techniques and heuristic techniques that includes capturing behavior of the GPU application by monitoring several GPU hardware counters that comprise several hardware resources and performance counters. The tuning GPU parameters also implements a set of heuristic techniques to decide course of the tuning for various GPU parameters based on the captured behaviour of the GPU hardware counters.

Referring now to the drawings, and more particularly to FIG. 1 through FIG. 5A and FIG. 5B, where similar reference characters denote corresponding features consistently throughout the figures, there are shown preferred embodiments and these embodiments are described in the context of the following exemplary system and/or method.

FIG. 1 is a block diagram for tuning graphics processing unit (GPU) parameters of a GPU kernel, in accordance with an example embodiment.

In an embodiment of the present disclosure, the FIG. 1 illustrates a system for tuning GPU parameters of a GPU kernel (100). The system (100) comprises an input module (102) configured for receiving a plurality of data regarding a GPU application. The plurality of data regarding the GPU applications includes a plurality of GPU parameters to be tuned for optimal functioning of GPU kernels, an execution time of the plurality of GPU parameters to be tuned, the GPU application's architecture, a plurality hardware counters and a plurality of performance counters.

The system (100) further comprises a functional value module (104) configured for representing a functional value for each the plurality of GPU parameters as an optimization problem defined for in terms of a response function, wherein the response function includes at least one of the plurality hardware counters or the execution time of the GPU parameter.

The system (100) further comprises a hardware counter identifier (106) for continuously monitoring and capturing behavior of the plurality of GPU parameters to identify at least one hardware counter from the plurality hardware counters that impact the execution time of the GPU kernel and functioning of the plurality of GPU parameters to be tuned.

The system (100) further comprises a dynamic tuner (108) configured for dynamically tuning each of the plurality of GPU parameters to obtain the functional value of each of the plurality GPU parameters for the optimization problem using at least one of a deterministic or a heuristic techniques using the plurality hardware counters identified for each the plurality of GPU parameters.

The system (100) further comprises a display module (110) configured for displaying each GPU parameter along with its dynamically tuned optimal functional value for optimal functioning of GPU kernels. The various modules of the system (100) for tuning GPU parameters of a GPU kernel are implemented as at least one of a logically self-contained part of a software program, a self-contained hardware component, and/or, a self-contained hardware component with a logically self-contained part of a software program embedded into each of the hardware component that when executed perform the above method described herein.

According to an embodiment of the disclosure, the system 100 for tuning GPU parameters of a GPU kernel comprises the input module (102) configured for receiving a plurality of data regarding GPU application. The plurality of data regarding the GPU applications includes a plurality of GPU parameters to be tuned for optimal functioning of GPU kernels, an execution time of the plurality of GPU parameters to be tuned, the GPU application's architecture, a plurality hardware counters and a plurality of performance counters.

Figure 2:
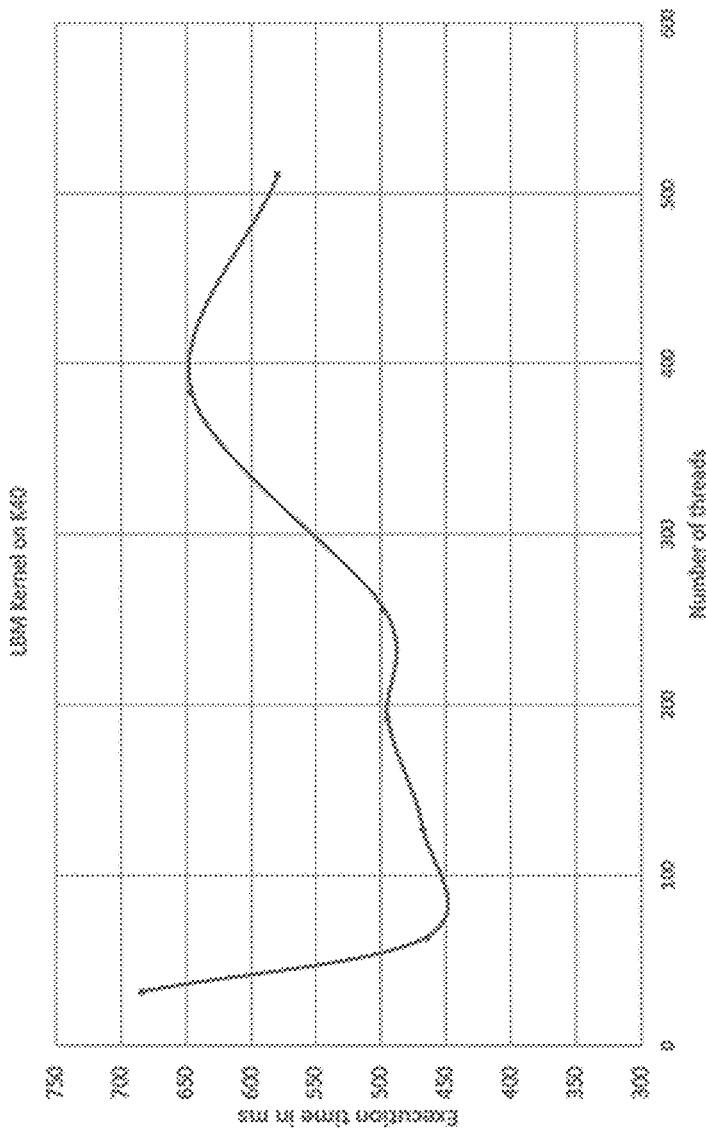
FIG. 2 is a graph illustrating the impact of the GPU parameter thread per block on the performance of GPU kernel in accordance with some embodiments of the present disclosure.
Figure 3:
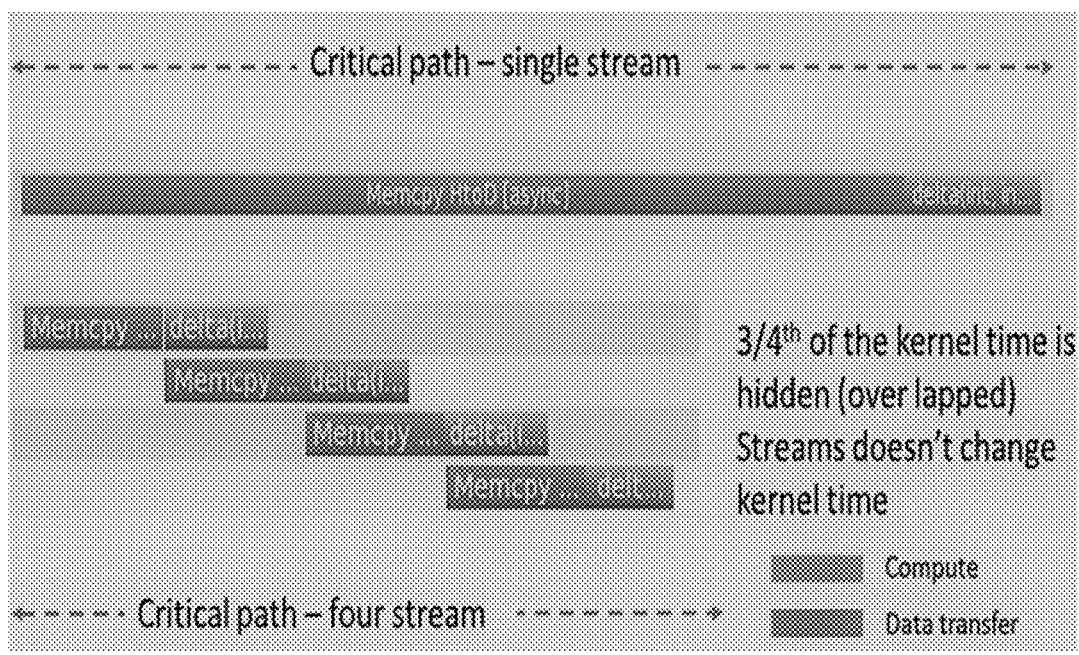
FIG. 3 illustrates a diagram for the impact of the GPU parameter number of streams (n-streams) on the performance of GPU kernel in accordance with some embodiments of the present disclosure.

In an embodiment the GPU parameters to be tuned include a thread per block parameter, number of streams (n-streams) parameter, a global memory parameter and a L1/shared partition parameter. The GPU parameters selected for tuning are of prime importance for performance tuning as kernel execution on GPUs are organized through set of thread per blocks that are mapped to hardware counters on a set of streaming multiprocessors (SM) that are shared among data parallel threads. Considering the first GPU parameter proposed for dynamic tuning—the thread per block parameter. The configuration of a GPU kernel takes two most important parameters; (a) number of blocks and (b) number of threads per block, hence these parameters to maximize the utilization of resources like registers per SM it is necessary to maximize number of threads to increases the amount of parallelism which, in general, increases performance as shown in FIG. 2, wherein the execution time for different number of threads per block for a GPU kernel (Lattice Boltzmann Benchmark (LBM) Kernel) is illustrated. Further considering the next GPU parameter proposed for dynamic tuning—the number of streams (n-streams), the number of stream represents a sequence of operations that execute in issue order on the GPU, wherein a stream essentially contains data copy from host to device, kernel execution and data copy from device to host that significantly impact the performance. Also multi-stream execution hides latencies by overlapping compute and communication, hence making the number of streams (n-streams) a significant parameter that affects the performance of the GPU kernel as shown in FIG. 3, wherein the execution time for different number of the number of streams (n-streams) is illustrated. Further considering another GPU parameter proposed for dynamic tuning—the global memory (GMEM) parameter that is accessible by both GPU and Central Processing Unit (CPU), wherein accessing the GMEM (in case of cache miss is a costly operation as GMEM) has high latency and low throughput. Therefore, optimization of the GMEM load requires complete utilization of bandwidth of the bus that include cached and non-cached loads access 128 byte and 32 byte lines respectively. Hence considering the impact of global memory on GPU kernel, it becomes important to tune it dynamically for optimal performance of the GPU kernel. Further considering the next GPU parameter proposed for dynamic tuning—the L1/shared partition parameter that is accessed by all threads in a thread block, wherein based on the requirement, the application can configure the sizes of the L1/shared memory as 16 KB and 48 KB respectively or vice versa. Thus, making the L1/shared partition a significant parameter that affects the performance of the GPU kernel. Hence the tuning of proposed GPU parameters the thread per block parameter, the number of streams (n-streams) parameter, the global memory parameter and the L1/shared partition parameter are of prime importance for performance tuning during the working of the GPU kernel.

According to an embodiment of the disclosure system 100 for tuning GPU parameters of a GPU kernel (100) further comprises the functional value module (104) configured for representing a functional value for each the plurality of GPU parameters as an optimization problem defined for in terms of a response function, wherein the response function includes at least one of the plurality hardware counters or the execution time of the GPU parameter. The objective for dynamic auto tuning is twofold; (a) reaching closer to a global optima as much as possible, (b) reducing the budget of experiments for optimization. If parameters under consideration are mutually exclusive, it is possible to reach the optimal parameter configuration by optimizing each parameter separately.

In one embodiment, the relatively exclusive parameters are represented as $\mathbb{P}_1, \mathbb{P}_2, \ldots \mathbb{P}_N$ then the functional value $(x^*)$ for each the plurality of GPU parameter is represented as the optimization problem defined in terms of a response function $(f_*(x_*))$ where * represents the GPU parameter and is defined as shown below;

$$x^* = <x_1, \ldots x_n>, \text{ where}$$

$$\text{opt } f_1(x_1) \forall x_1 \in \mathbb{P}_1, \ldots, \text{opt } f_n(x_n) \forall x_n \in \mathbb{P}_n$$

The response function $f_1$ may represent either execution time of an application under parameter configuration $x_1$, or profiling certain hardware counters affected by $x_1$.

According to an embodiment of the disclosure system 100 for tuning GPU parameters of a GPU kernel (100) further comprises the hardware counter identifier (106) for continuously monitoring and capturing behavior of the plurality of GPU parameters to identify at least one hardware counter from the plurality hardware counters that impact the execution time of the GPU kernel and functioning of the plurality of GPU parameters to be tuned.

Figure 4:
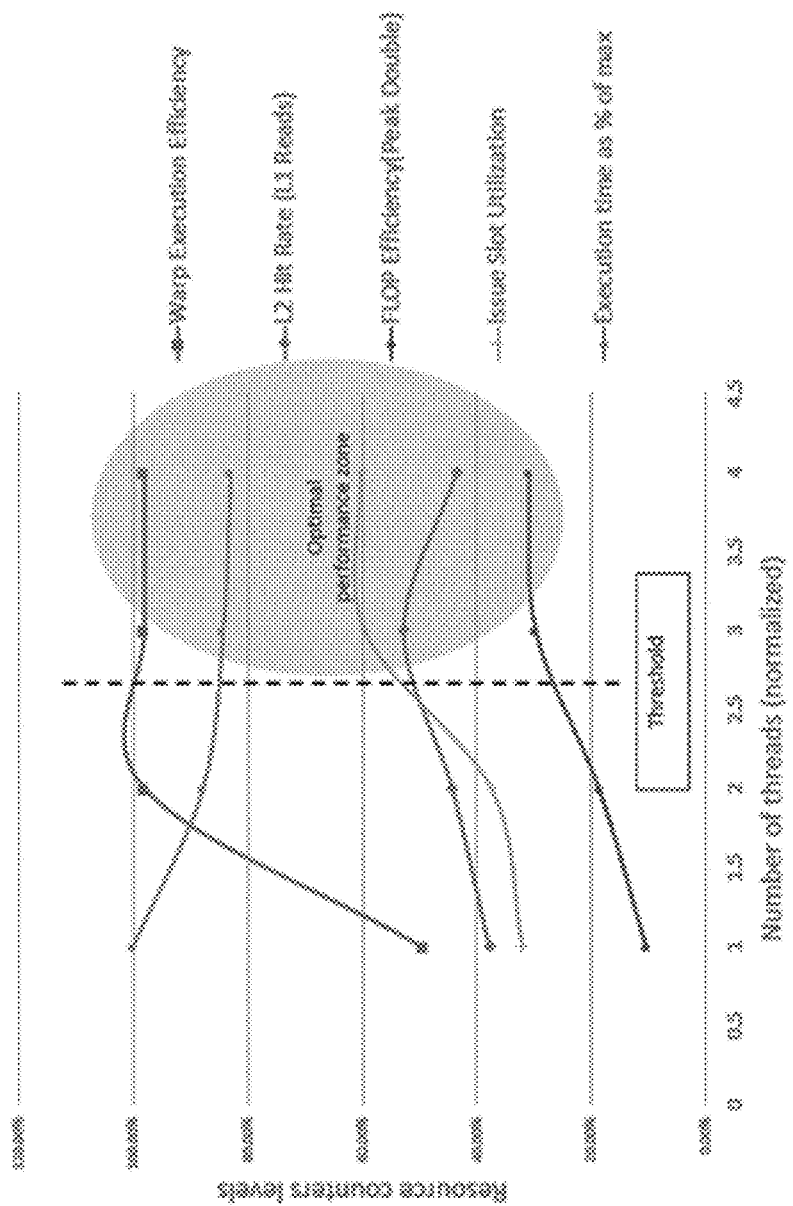
FIG. 4 is a graph illustrating performance of several hardware counters as the GPU parameter thread per block is varies, in accordance with some embodiments of the present disclosure.

In one embodiment, the capturing & identifying hardware counters is performed for dynamic analysis of hardware counters using an existing profiling tool that include a nvidia profiler. The profiling tool has been used for observations of on several GPU kernels that include Rodinia from numerous domains that include finance, life sciences, matrix computations. The proposed tuning algorithms leverages these observations and quickly achieves parameter values which result in optimal performance that form the inputs to proposed deterministic techniques. The FIG. 4 is a graph illustrating performance of several hardware counters as the GPU parameter thread per block is varies, in accordance with some embodiments of the present disclosure.

According to an embodiment of the disclosure system for tuning GPU parameters of a GPU kernel further comprises the dynamic tuner (108) configured for dynamically tuning each of the plurality of GPU parameters to obtain the functional value of each of the plurality GPU parameters for the optimization problem using at least one of a deterministic or a heuristic techniques using the plurality hardware counters identified for each the plurality of GPU parameters.

The GPU parameter thread per block is dynamically tuned based on the deterministic and the heuristic techniques in the in the dynamic tuner (108). The deterministic and the heuristic techniques for dynamically tuning the thread per block GPU parameter are implemented by computing a test_score parameter using the identified hardware counters that impact the execution time of the GPU kernel and functioning of the GPU parameter thread per block by determining a weight for each of the hardware counters identified.

A set of hardware counters are identified by capturing the GPU kernel execution time with varying thread per block using an existing profiling tool that include a nvidia profiler for dynamically tuning the GPU parameter number of streams using the deterministic and the heuristic techniques that is based on randomized grid search technique. In one embodiment, the set of hardware counter identified for dynamically tuning the GPU parameter thread per block is identified as hardware counters for memory, compute and warps. If $T_m$, $T_c$ and $T_w$ represent number of counters for memory, compute and warps respectively and these counters vary with number of threads represented as $N_m$, $N_c$ and $N_w$ number of memory, compute and warp performance counters which achieve roof line for a profiled execution of a GPU kernel. Further weights are assigned for identified hardware counters $W_{mem}$, $W_{comp}$ and $w_{warp}$ for memory, compute and warps counters to decide whether a kernel is memory or compute bound, dram and alu utilizations are observed since profiler reports these utilizations as either low, medium or high. Based on the utilization levels, these are computed using a pre-determined table 1 of weight matrix as shown below.

TABLE 1

Weight matrix table

|  | $W_{mem}$, $W_{comp}$ | alu_utilization | | |
|---|---|---|---|---|
|  |  | Low | Mid | High |
| dram_utilization | Low | 40, 40 | 30, 50 | 20, 60 |
|  | Mid | 50, 30 | 40, 40 | 30, 50 |
|  | High | 60, 20 | 50, 30 | 46, 40 |

If observed dram_utilization and alu_utilization are low and mid respectively, then $W_{mem}$=30, $W_{comp}$=50 and the value of $W_{warp}$=20 is set for all cases. If P denote search space with cardinality N then the P is divided into $\log_2 N$ partitions as P={P1|P2| ... |P$_{log2}$ N}. The test_score is computed using the identified hardware counters as shown below;

$$test_{score} = \left[ \frac{N_m \cdot W_{mem}}{T_m} + \frac{N_c \cdot W_{comp}}{T_c} + \frac{N_w \cdot W_{warp}}{T_w} \right]$$

The thread per block (opt_thrd) is dynamically tuned based on the comparison between the test_score and a current score.

The GPU parameter number of streams is dynamically tuned based on the deterministic and the heuristic techniques in the dynamic tuner (108). The deterministic and the heuristic techniques for dynamically tuning the number of streams GPU parameter are implemented based on the identified hardware counters that impact the execution time of the GPU kernel, functioning of the GPU parameter number of streams and a set of heuristically pre-determined factors that include a bandwidth factor and a cutoff factor.

A set of hardware counters are identified by capturing the GPU kernel execution time with varying number of streams using an existing profiling tool that include a nvidia profiler for dynamically tuning the GPU parameter number of streams using the deterministic and the heuristic techniques.

In one embodiment, the set of hardware counter identified for dynamically tuning the GPU parameter number of streams is identified as host to device (h2d), kernel computation (comp), and data copy from device to host (d2h). Further a set of heuristically pre-determined factors data transfer bandwidth (bw) and cutoff (optimal chunk size) are inputs along with the hardware counter identified to dynamically tune number of streams (n-streams). If comp consumes more than 80% of the stream, then streams should be executed in sequence since it not possible to achieve compute communication overlaps, else optimal data size for efficient h2d and d2h is used to determine the number of streams (str) as shown below.

$$str = \frac{\min(h2d, d2h) \cdot bw}{cutoff}$$

The bw and cutoff is calculated offline. Beyond four streams, the overhead and reduction becomes crucial and can be computed as shown below;

$$\approx [L - L \cdot \log 2(str)6 + 0.02 \cdot (str \cdot L)].$$

Where L is execution time in a single stream and str denotes number of streams.

The GPU parameter global memory comprise of cache ($C_a$) and non-cache ($C_g$) parameters that are dynamically tuned in the dynamic tuner (108) using the deterministic techniques. The deterministic techniques for dynamically tuning the global memory GPU parameter are implemented based on the identified hardware counters that impact the execution time of the GPU kernel and functioning of the GPU parameter global memory. Further the capturing & identifying hardware counters is performed for dynamic analysis of hardware counters using an existing profiling tool that include a nvidia profiler.

A hardware counter is identified by capturing the GPU kernel execution time with varying global memory parameter using an existing profiling tool that include a nvidia profiler for dynamically tuning the GPU parameter L1/shared partition using the deterministic techniques. In an embodiment, the hardware counter identified for dynamically tuning the GPU parameter global memory is identified as gld_efficiency. After compiling the GPU kernel with cache ($C_a$) and non-cache ($C_g$), the gld_efficiency is observed by profiling and argument that provides higher efficiency is chosen.

The GPU parameter L1/shared partition are dynamically tuned in the dynamic tuner (108) using the deterministic techniques. The deterministic techniques for dynamically tuning the GPU parameter L1/shared partition are implemented based on a pre-determined threshold value of the identified hardware counters that impact the execution time of the GPU kernel and functioning of the GPU parameter L1/shared partition. Further the capturing & identifying hardware counters is performed for dynamic analysis of hardware counters using an existing profiling tool that include a nvidia profiler.

A hardware counter is identified by capturing the GPU kernel ?execution time with varying L1/shared partition using an existing profiling tool that include a nvidia profiler for dynamically tuning the GPU parameter L1/shared partition using the deterministic techniques. In one embodiment, the hardware counter identified for dynamically tuning the GPU parameter L1/shared partition is identified as l1_shared_utilization. A pre-determined threshold value of utilization level is defined as 48 KB, wherein a value greater that 48 KB is configured as shared memory, otherwise, else a value lesser that 48 KB is classified as L1 cache.

According to an embodiment of the disclosure system for tuning GPU parameters of a GPU kernel further comprises the display module (110) configured for displaying each GPU parameter along with its dynamically tuned optimal functional value for optimal functioning of GPU kernels.

The experimental results of dynamically tuning optimal functional parameters using proposed system (represented as Auto tune) in comparison with two other existing systems (hyperopt) is provided in Table 2 shown below:

TABLE 2

Experimental results for dynamic tuning of GPU parameters using Hyperopt & Autotune (proposed system )

| kernal | Hyperopt(100) | | Autotune(10) | | Wrap only guided Autotune(10) | |
|---|---|---|---|---|---|---|
| | best perfomance (ms) | value | perfomance (ms) | value | perfomance (ms) | value | perfomance (ms) |
| VaR | 29.67 | 400 | 32.1 | 720 | 29.2 | 80 | 29.7 |
| Bscholes | 2.49 | 96 | 2.6 | 256 | 2.5 | 256 | 2.53 |
| FX | 7.92 | 160 | 7.9 | 256 | 8.1 | 128 | 7.9 |
| POW | 8.68 | 384 | 9.04 | 256 | 8.8 | 128 | 8.6 |
| CovMT | 66.5 | 656 | 68.5 | 512 | 66.5 | 1024 | 67.6 |
| Opti | 1.53 | 352 | 1.53 | 640 | 1.6 | 800 | 1.6 |

The experimental results is performed on six kernels on K40 GPU architecture using hyperopt and proposed system (autotune) techniques is shown in table 2.

Figure 5A:
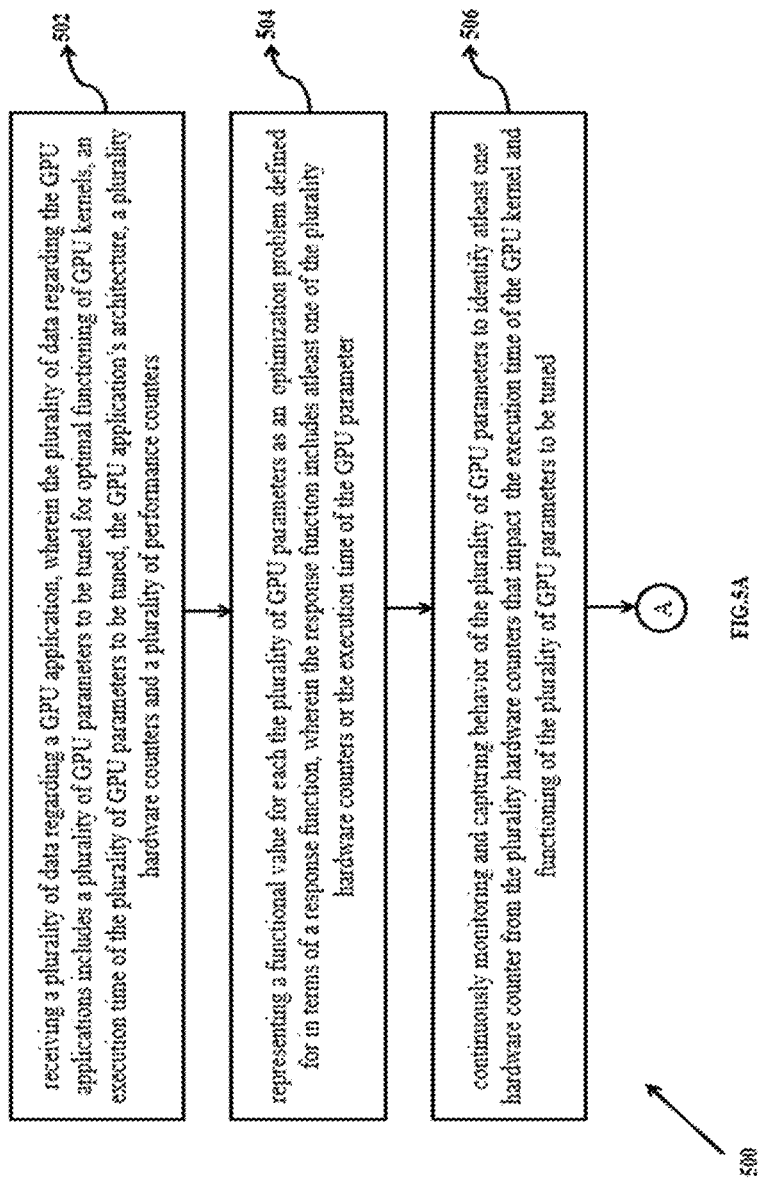

FIG. 5A and FIG. 5B, with reference to FIG. 1, is an exemplary flow diagram illustrating a method (500) for tuning graphics processing unit (GPU) parameters of a GPU kernel using the system 100 of FIG. 1 according to an embodiment of the present disclosure. The steps of the method of the present disclosure will now be explained with reference to the components of the system for tuning GPU parameters of a GPU kernel (100) and the modules (102-110) as depicted in FIG. 1, and the flow diagram as depicted in FIG. 5A and FIG. 5B.

At step 502, the method (500) includes receiving a plurality of data regarding a GPU application in the input module (102), wherein the plurality of data regarding the GPU applications includes a plurality of GPU parameters to be tuned for optimal functioning of GPU kernels, an execution time of the plurality of GPU parameters to be tuned, the GPU application's architecture, a plurality hardware counters and a plurality of performance counters. In an embodiment the GPU parameters to be tuned include a thread per block parameter, a number of streams (n-streams) parameter, a global memory parameter and a L1/shared partition parameter.

In the next step at 504, the method (500) includes representing a functional value for each the plurality of GPU parameters in the functional value module (104) as an optimization problem defined for in terms of a response function, wherein the response function includes at least one of the plurality hardware counters or the execution time of the GPU parameter.

In an embodiment, the functional value ($x^*$) for each the plurality of GPU parameter is represented as the optimization problem defined in terms of a response function ($f_*(x_*)$) where * represents the GPU parameter and is defined as shown below;

$$x^* = <x_1, \ldots x_n>, \text{ where}$$

$$\text{opt } f_1(x_1) \forall x_1 \in \mathbb{P}_1, \text{opt } f_n(x_n) \forall x_n \in \mathbb{P}_n$$

In the next step at 506, the method (500) includes continuously monitoring and capturing behavior of the plurality of GPU parameters in the hardware counter identifier (106) to identify at least one hardware counter from the plurality hardware counters that impact the execution time of the GPU kernel and functioning of the plurality of GPU parameters to be tuned. In an embodiment, the capturing & identifying hardware counters is performed for dynamic analysis of hardware counters using an existing profiling tool that include a nvidia profiler.

In the next step at 508, the method (500) includes dynamically tuning each of the plurality of GPU parameters in the dynamic tuner (108) to obtain the functional value of each of the plurality GPU parameters for the optimization problem using at least one of a deterministic or a heuristic techniques using the plurality hardware counters identified for each the plurality of GPU parameters.

In an embodiment, the GPU parameter thread per block is dynamically tuned based on the deterministic and the heuristic techniques in the in the dynamic tuner (108). The deterministic and the heuristic techniques for dynamically tuning the thread per block GPU parameter are implemented by computing a test_score parameter using the identified hardware counters that impact the execution time of the GPU kernel and functioning of the GPU parameter thread per block by determining a weight for each of the hardware counters identified.

In an embodiment, the GPU parameter number of streams is dynamically tuned based on the deterministic and the heuristic techniques in the dynamic tuner (108). The deterministic and the heuristic techniques for dynamically tuning the number of streams GPU parameter are implemented based on the identified hardware counters that impact the execution time of the GPU kernel, functioning of the GPU parameter number of streams and a set of heuristically pre-determined factors that include a bandwidth factor and a cutoff factor.

In an embodiment, the GPU parameter global memory comprise of cache (Ca) and non-cache (Cg) parameters that are dynamically tuned in the dynamic tuner (108) using the deterministic techniques. The deterministic techniques for dynamically tuning the global memory GPU parameter are implemented based on the identified hardware counters that impact the execution time of the GPU kernel and functioning of the GPU parameter global memory.

In an embodiment, the GPU parameter L1/shared partition are dynamically tuned in the dynamic tuner (108) using the deterministic techniques. The deterministic techniques for dynamically tuning the GPU parameter L1/shared partition are implemented based on a pre-determined threshold value of the identified hardware counters that impact the execution time of the GPU kernel and functioning of the GPU parameter L1/shared partition.

In the next step at 510, the method (500) includes displaying each GPU parameter along with its dynamically tuned optimal functional value for optimal functioning of GPU kernels in the display module (110).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Hence a method and a system for tuning graphics processing unit (GPU) parameters of a GPU kernel is provided. The disclosure proposes a combination of both heuristic and deterministic techniques for tuning GPU parameters of a GPU kernel to achieve optimal configuration of the GPU parameters. The proposed method and a system for tuning GPU parameters is based on deterministic techniques and heuristic techniques that includes capturing behavior of the GPU application by monitoring several GPU hardware counters that comprise several hardware resources and performance counters. The proposed tuning GPU parameters also implements a set of heuristic techniques to decide course of the tuning for various GPU parameters based on the captured behaviour of the GPU hardware counters.

It is to be understood that the scope of the protection is extended to such a program and in addition to a computer-readable means having a message there in; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor-implemented method for tuning graphics processing unit (GPU) parameters of a GPU kernel, the method comprising:
    receiving a plurality of data regarding a GPU application, wherein the plurality of data regarding the GPU application includes a plurality of GPU parameters to be tuned for optimal functioning of the GPU kernel, an execution time of the plurality of GPU parameters to be tuned, the GPU application's architecture, a plurality hardware counters and a plurality of performance counters (502);
    representing a functional value for each of the plurality of GPU parameters as an optimization problem defined for in terms of a response function, wherein the response function includes at least one of the plurality hardware counters or the execution time of each of the plurality of GPU parameters (504);
    continuously monitoring and capturing behavior of the plurality of GPU parameters to identify at least one hardware counter from the plurality hardware counters that impact the execution time of the GPU kernel and functioning of the plurality of GPU parameters to be tuned (506);
    dynamically tuning each of the plurality of GPU parameters to obtain the functional value of each of the plurality of GPU parameters for the optimization problem using at least one of a deterministic or heuristic techniques using the plurality hardware counters identified for each of the plurality of GPU parameters (508); and displaying each of the plurality of GPU parameters along with its dynamically tuned optimal functional value for optimal functioning of the GPU kernel (510).

2. The method of claim 1, wherein the plurality of GPU parameters to be tuned include a thread per block parameter, a number of streams (n-streams) parameter, a global memory parameter and a L1/shared partition parameter.

3. The method of claim 1, wherein the functional value ($x^*$) for each of the plurality of GPU parameters is represented as the optimization problem defined in terms of a response function ($f_*$ ($x_*$)) where * represents the GPU parameter and is defined as shown below;

$x^* = <x_1 \ldots x_n>$, where opt $f_1(x_1) \forall x_1 \in \mathbb{P}_1, \ldots,$ opt $f_n(x_n) \forall x_n \in \mathbb{P}_n$ 4. The method of claim 1, wherein the capturing and identifying hardware counters is performed for dynamic analysis of hardware counters using an existing profiling tool that include a nvidia profiler.

5. The method of claim 1, wherein the GPU parameter thread per block is dynamically tuned based on the deterministic and the heuristic techniques by computing a test_score parameter using the identified hardware counters that impact the execution time of the GPU kernel and functioning of the GPU parameter thread per block by determining a weight for each of the hardware counters identified.

6. The method of claim 1, wherein the GPU parameter number of streams is dynamically tuned based on the deterministic and the heuristic techniques based on the identified hardware counters that impact the execution time of the GPU kernel, functioning of the GPU parameter number of streams and a set of heuristically pre-determined factors that include a bandwidth factor and a cutoff factor.

7. The method of claim 1, wherein the GPU parameter global memory comprise of cache ($C_a$) and non-cache ($C_g$) parameters that are dynamically tuned using the deterministic techniques based on the identified hardware counters that impact the execution time of the GPU kernel and functioning of the GPU parameter global memory.

8. The method of claim 1, wherein the GPU parameter L1/shared partition are dynamically tuned using the deterministic techniques based on a pre-determined threshold value of the identified hardware counters that impact the execution time of the GPU kernel and functioning of the GPU parameter L1/shared partition.

9. A system (100) for tuning graphics processing unit (GPU) parameters for a graphics processing unit (GPU) kernel, the system (100) is communicatively coupled to a graphics processing unit (GPU), wherein the system (100) is configured to:

receive a plurality of data regarding a GPU application, wherein the plurality of data regarding the GPU application includes a plurality of GPU parameters to be tuned for optimal functioning of the GPU kernel, an execution time of the plurality of GPU parameters to be tuned, the GPU application's architecture, a plurality hardware counters and a plurality of performance counters;

represent a functional value for each the plurality of GPU parameters as an optimization problem defined for in terms of a response function, wherein the response function includes at least one of the plurality hardware counters or the execution time of each of the plurality of GPU parameters;

continuously monitor and capture behavior of the plurality of GPU parameters to identify at least one hardware counter from the plurality hardware counters that impact the execution time of the GPU kernel and functioning of the plurality of GPU parameters to be tuned;

dynamically tune each of the plurality of GPU parameters to obtain the functional value of each of the plurality GPU parameters for the optimization problem using at least one of a deterministic or heuristic techniques using the plurality hardware counters identified for each of the plurality of GPU parameters; and display each of the plurality of GPU parameters along with its dynamically tuned optimal functional value for optimal functioning of the GPU kernel.

10. A non-transitory computer-readable medium having embodied thereon a computer readable program, wherein the computer readable program when executed by one or more hardware processors, cause:

receiving a plurality of data regarding a GPU application, wherein the plurality of data regarding the GPU application includes a plurality of GPU parameters to be tuned for optimal functioning of a GPU kernel, an execution time of the plurality of GPU parameters to be tuned, the GPU application's architecture, a plurality hardware counters and a plurality of performance counters;

representing a functional value for each the plurality of GPU parameters as an optimization problem defined for in terms of a response function, wherein the response function includes at least one of the plurality hardware counters or the execution time of each of the plurality of GPU parameters;

continuously monitoring and capturing behavior of the plurality of GPU parameters to identify at least one hardware counter from the plurality hardware counters that impact the execution time of the GPU kernel and functioning of the plurality of GPU parameters to be tuned;

dynamically tuning each of the plurality of GPU parameters to obtain the functional value of each of the plurality GPU parameters for the optimization problem using at least one of a deterministic or heuristic techniques using the plurality hardware counters identified for each of the plurality of GPU parameters; and displaying each of the plurality of GPU parameters along with its dynamically tuned optimal functional value for optimal functioning of the GPU kernel.

* * * * *